June 23, 1970  J. KRAMPE  3,516,307
WIRE AND CABLE STRIPPING DEVICE
Filed March 17, 1969  2 Sheets-Sheet 1

INVENTOR
JOSEF KRAMPE

By Michael S. Striker
Attorney

June 23, 1970  J. KRAMPE  3,516,307
WIRE AND CABLE STRIPPING DEVICE
Filed March 17, 1969  2 Sheets-Sheet 2
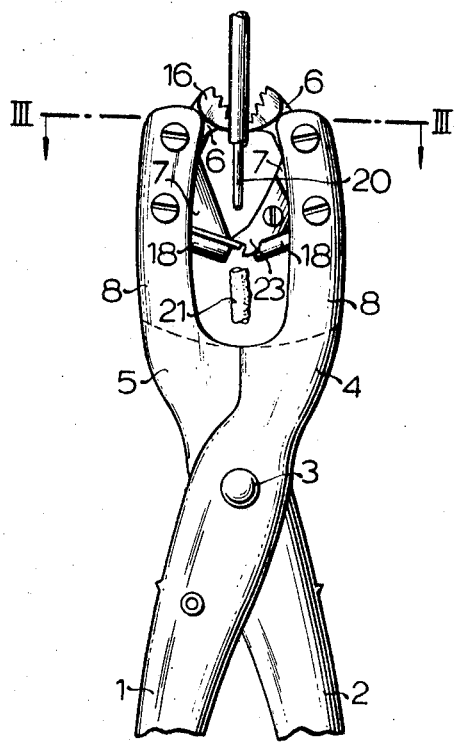
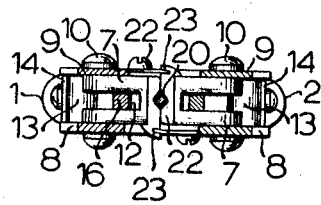
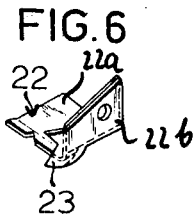
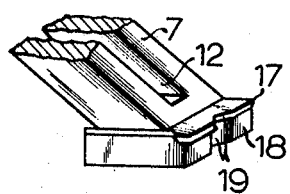
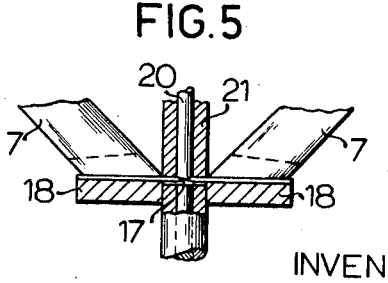
INVENTOR
JOSEF KRAMPE

United States Patent Office 3,516,307
Patented June 23, 1970

3,516,307
WIRE AND CABLE STRIPPING DEVICE
Josef Krampe, 4 Werner Strasse, 4711 Herbern, Germany
Filed Mar. 17, 1969, Ser. No. 807,565
Claims priority, application Austria, Dec. 20, 1968,
A 12,448/68
Int. Cl. H02g 1/12
U.S. Cl. 81—9.5                                    10 Claims

ABSTRACT OF THE DISCLOSURE

A plier carries at its respective jaws a set of two levers each. Both levers are pivoted to a respective jaw with their connected ends and project towards the other jaw with their free ends. The two levers of each set cross one another and one lever is guided for sliding movement relative to the other by and on the other lever. One lever of each set grips a wire located intermediate the jaws when the pliers are operated in a sense moving the jaws closer together, and subsequent to such gripping the other lever of each set cuts through the insulation provided on the wire and then moves away from the respective first lever to strip the insulation off the wire.

Background of the invention

The present invention concerns an insulation removing device in general, and more particularly a device for stripping insulation from wires and cables.

Devices for stripping insulation from wires and cables are already well known. There are, in fact, a great many such devices available. However, while they all perform the intended insulation-stripping function, the various devices known to me suffer from a variety of disadvantages. Thus, some of the known devices are very heavy and difficult for an operator to carry with them. Others are very complicated in their construction and susceptible to breakdowns. Still others are difficult to operate or require complicated operations.

Ideally, a device of the type in question should be light-weight, simple in its construction, inexpensive, and very uncomplicated in its use. As of the present time I am not aware of such a device which would incorporate all of these desirable features.

Summary of the invention

It is, accordingly, an object of the present invention to provide a device of the type under discussion which has the aforementioned advantages and avoids the disadvantages which have been outlined with respect to the prior art.

More particularly, it is an object of the present invention to provide such a wire and cable stripping device which is of the plier type, and which is simple in its construction and therefore reliable in its operation, as well as being inexpensive.

In addition it is an object of the invention to provide such a device which is light-weight and whose operation is very uncomplicated.

In pursuance of the above objects, and others which will become apparent hereafter, one feature of my invention resides in the provision of a wire and cable stripping device which comprises a pair of complementary arms each having at one end a handle portion and at the other end a jaw portion. Pivot means pivotably connects the arms intermediate their respective ends for movement about a pivot axis which is normal to the elongation of the arms.

In accordance with my invention I provide gripping means which is provided on the jaw portions and which is operated for gripping an insulated wire to be stripped, in response to movement of the jaw portions towards one another. Stripping means is also provided on the jaw portions and is operative for servering the insulation and stripping the severed insulation from the wire gripped by the gripping means, in response to additional movement of the jaw portion towards one another.

My novel wire and cable stripping device enables the removal of insulation from insulated wire and cables without requiring adjustments to accommodate the device for the thickness of the insulation, or rather the diameter of the insulated wire. In other words, as long as the overall outer diameter of the installation is within a predetermined maximum, the device will adjust itself automatically and will be capable of effecting stripping of the insulation regardless of the overall outer diameter and wall thickness of the insulation.

Because my device is uncomplicated in its construction, and requires parts which can be manufactured with little or no emphasis on precision work and maintenance of rigid tolerances, and further which parts can be readily assembled, it is simple and inexpensive to make. Furthermore, it is considerably lighter than what is known in the art for comparable devices and can therefore be carried along readily by an operator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Brief description of the drawing

FIG. 2 is a fragmentary view similar to FIG. 1 but showing the device in operative position;

FIG. 3 is a view as seen on the line III—III of FIG. 2;

FIG. 4 is a fragmentary detail view, partly sectioned, of a stripping lever used in the device of FIGS. 1 and 2;

FIG. 5 is a fragmentary detail view on an enlarged scale, and partly sectioned, showing the stripping levers after they have severed the insulation, but prior to stripping of the latter; and FIG. 6 is a perspective view illustrating a spacing member such as is used in the illustrated embodiment of the preceding figures.

Description of the preferred embodiments

Figure 1:
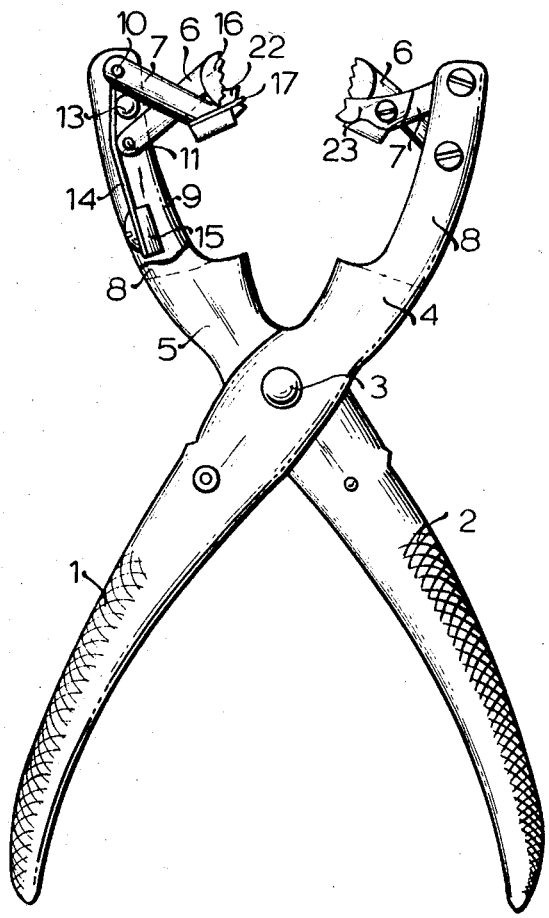
FIG. 1 is a plan view illustrating my novel device in inoperative position.

Discussing now the drawing in detail, and firstly FIG. 1 thereof which shows my novel device in inoperative position, it will be seen that the device generally is of the plier type. It is provided with two complementary arms each of which has at one end a handle portion, respectively identified with reference numerals 1 and 2, and at the other end a jaw portion, respectively identified with reference numerals 4 and 5. Intermediate the opposite ends the arms are pivotally connected for turning movement about a pivot axis extending normal to their elongation, by a pin, bolt, or the like which is identified with reference numeral 3. Thus far, the construction is entirely conventional and it remains to be pointed out that the jaw portions 4 and 5 are of hollow generally U-shaped cross section (compare FIG. 3) and each comprise side walls which are identified with reference numerals 8 and 9.

Each of the jaw portions carries two levers 6 and 7 whose connected ends are secured to the respective jaw portion by pins or the like, such as the pin 10 which extends between the side walls 8 and 9 and through the connected end of the respective lever 7, and the pin 11 which also extends between the side walls 8 and 9 and through the connected end of the respective lever 6. The levers 6 and 7 of each pair or set cross one another as illustrated in FIG. 1. According to the preferred embodiment each of the levers 7 is provided with a longitudinal slot 12 (compare FIG. 4) in which a portion of the associated lever 6 is guided for sliding movement in a longitudinal direction of the respective slot 12. Each set of levers 6 and 7 is permanently biassed to the position illustrated in FIG. 1—that is the position which the levers 6 and 7 assume with respect to one another—by the provision of a cylindrical roller 13 which is located in the interior of the respective U-shaped jaw portion and is loosely received between the connected ends of the associated levers 6 and 7, with a leaf spring 14 being secured to a cross piece or bridging member 15 which extends between the respective side walls 8 and 9 of each jaw, and which leaf spring abuts against the roller 13 and tends to press the same towards the crossing point of the levers 6 and 7 where the same are secured to one another. The roller 13 is freely located in the manner shown in FIG. 1 and is not held by anything other than its confinement between the connected ends of the levers 6 and 7 and the abutting portion of the leaf spring 13. The arrangement of the levers 6 and 7, the roller 13 and the leaf spring 14 is the same in each case, that is on each of the jaw portions of the pliers. It will be appreciated that the action of the leaf spring 14 which in each case tends to move the roller 13 towards the point of connection and intersection of the respective associated levers 6 and 7, forces the levers 6 and 7 to assume the respective positions illustrated in FIG. 1.

The free end of each of the levers 6 is provided with a toothed jaw 16. Thus, the levers 6 are gripping levers.

The free end of each of the levers 7, which latter are stripping levers, is provided with a cutting edge extending transversely to the elongation of the respective lever 7. In the illustrated embodiment this cutting edge—which may of course be of one piece with the respective lever 7—is seen to be provided instead on a cutting plate 17 secured in suitable manner to the respective lever 7. Regardless of whether the cutting edge is provided on a separate cutting plate 17, or is of one piece with the respective lever 7, there is always provided an abutment plate 18 positioned in the manner shown in FIG. 4 and having an abutment face inwardly recessed from the respective cutting edge. The cutting edge in each case is provided with an angular recess or depression 19 and the abutment face of the abutment plate 18 is similarly provided with a correspondingly configurated angular recess 19 which registers with that provided in the cutting edge. The purpose of the abutment face on the respective abutment plates 18 is to abut against the insulation of wire to be stripped, and the purpose of the recesses or depressions 19 is to provide for centering and better holding of the wire. Each abutment face on the respective abutment plates 18 is recessed inwardly of the associated cutting edge by a distance corresponding to the maximum wall thickness of insulation which is to be stripped. This is clearly evident from FIG. 5.

By the above arrangement, and the provision of the recesses 19, the device can adjust itself to the wall thickness of the insulation to be stripped, and needs no manual adjustment, as long as the wall thickness does not exceed the maximum value which is determined by the amount to which the abutment face on the respective abutment plate 18 is inwardly recessed from the associated cutting edge, as shown in FIG. 5.

Operation of the novel device will be obvious, and is illustrated for further clarification in FIG. 2. It will be appreciated that as pressure is exerted on the handle portions 1, 2 in the sense moving the same towards one another, the jaw portions 4, 5 will similarly move towards one another. Thus, the gripping jaws 16 provided on the three ends of the respective gripping levers 6 will engage an insulated wire 20 located between them, and on continued movement of the handle portions 1, 2 in direction towards one another, the cutting edges of the cutting plates 17 will enter into the insulation, severing the same as illustrated in FIG. 5. Still further movement of the handle portions 1, 2 in direction towards one another will result in movement of the free ends of the levers 7 downwardly away from the free ends of the levers 6, in the manner illustrated in FIG. 2, and during such movement the severed increment 21 of the insulation will be stripped from the wire 20. When thereupon the handle portions 1, 2 are released they move away from one another to the position shown in FIG. 1, under the influence of suitable biasing springs which are not illustrated because they are conventional in the art. Simultaneously, the respectively associated levers 6 and 7 of each set return from the position shown in FIG. 2 towards their inoperative position shown in FIG. 1, under the urging of the respective leaf springs 14.

It is desirable that the cutting edges on the respective levers 7 be protected against premature dulling or damaging. For this purpose each of the levers 7 is provided with a spacing member 22, and the two spacing members 22 will abut one another at the end of the insulation-severing step and before the cutting edges can contact each other. As shown particularly in FIG. 6, each of the spacing members 22 is of angular shape and consists of two mutually inclined portions 22a and 22b. The portion 22b in each case is shorter than the portion 22a and serves to connect the respective spacing member 22 to the associated lever 7, as illustrated in the drawing, particularly in FIG. 3 as well as in FIG. 2. Each portion 22b is provided with a projection 23. Each portion 22a is provided with a recess corresponding to the recesses 19, and the respective portions 22a serve as an abutment for the projections 23 of the respectively opposite spacing member 22 when the device is in the operative position shown in FIG. 2.

It will be understood that each of the elements described above, or two or more together, may also find a useful application in other types of constructions differing from the types described above.

While the invention has been illustrated and described as embodied in a wire and cable stripping device, it is not intended to be limited to the details shown, since various modifications and structural changes may be made without departing in any way from the spirit of the present invention.

What is claimed as new and desired to be protected by Letters Patent is set forth in the appended claims:

1. A wire and cable stripping device, comprising a pair of complementary arms each having at one end a handle portion and at the other end a jaw portion; pivot means pivotally connecting said arms intermediate the respective ends thereof for movement about a pivot axis normal to the elongation of said arms; gripping means provided on said jaw portions and operative for gripping an insulated wire to be stripped, in response to movement of said jaw portions towards one another, said gripping means comprising a first pair of gripping levers each having a connected end pivoted to one of said jaw portions, and a free end; and stripping means also provided on said jaw portions and operative for severing the insulation and stripping the severed insulation from the wire gripped by said gripping means, in response to additional movement of said jaw portions towards one another, said stripping means comprising a second pair of stripping levers each also having a connected end pivoted to one of said jaw portions and a free end, each stripping lever crossing the associated gripping lever and being connected thereto and guided thereby for movement relative thereto from an inoperative position in which their free ends are adjacent one another to an operative position in which their free ends are spaced apart in direction normal to said pivot axis.

2. A device as defined in claim 1, said jaw portions being of substantially U-shaped cross-section, said connected ends of the respective levers being located in the interior of the associated jaw portions and connected thereto by a pin extending across the respective U-shaped jaw portion and through the respective connected end in at least substantial parallelism with said pivot axis.

3. A device as defined in claim 1; further comprising biassing means permanently tending to bias said levers to said inoperative positions thereof.

4. A device as defined in claim 2, each gripping lever being slidably connected with the associated stripping lever; and further comprising biassing means permanently tending to bias said levers to said inoperative positions thereof, said biassing means including a pair of rollers each freely movably received in the interior of one of said jaw portions located between the connected ends of the gripping and stripping levers associated therewith, and a pair of leaf springs each located in the interior of one of said jaw portions and bearing against the respective roller in a sense urging the same towards the crossing point of the associated gripping and stripping levers.

5. A device as defined in claim 3, said stripping levers each having a longitudinally extending slot, and said gripping levers each having a portion extending into one of said slots and guided therein for movement along the respective slot.

6. A device as defined in claim 1, said stripping levers being each provided at the respective free ends thereof with cutting portions arranged to penetrate the insulation of insulated wire gripped by said gripping levers.

7. A device as defined in claim 6, said cutting portions comprising cutting plate members provided on said free ends of the respective stripping levers and having cutting edges arranged to contact and penetrate said insulation.

8. A device as defined in claim 7, said cutting edges being each provided with an angular recess for locating and retaining a wire to be stripped.

9. A device as defined in claim 8; further comprising abutment plate members each connected to one of said cutting plate members and each having an abutment face inwardly recessed from the respective cutting edge and arranged to abut against the insulation of the insulated wire to be stripped, each of said abutment faces being provided with an additional angular recess corresponding to and registering with the angular recess of the associated cutting edge.

10. A device as defined in claim 1, further comprising spacing means including cooperating spacing members of angular configuration and each having a shorter leg connected to one of said stripping levers and provided with a projection, and a longer leg extending from the shorter leg and arranged to abut against the projection of the respective other spacing member in response to movement of said stripping levers to said operative position thereof for preventing contact of said cutting edges with one another.

References Cited

UNITED STATES PATENTS 1,151,319   8/1915   Wood.

ROBERT C. RIORDON, Primary Examiner

R. V. PARKER, Jr., Assistant Examiner